(12) United States Patent
Rowley et al.

(10) Patent No.: US 6,970,877 B2
(45) Date of Patent: *Nov. 29, 2005

(54) REDUCING AND CONTROLLING SIZES OF PROTOTYPE-BASED RECOGNIZERS

(75) Inventors: Henry Rowley, Bellevue, WA (US); John Bennett, Sammamish, WA (US); Ahmad Abdulkader, Sammamish, WA (US); Petr Slavik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

This patent is subject to a terminal disclaimer.

(21) Appl. No.: 10/184,367

(22) Filed: Jun. 28, 2002

(65) Prior Publication Data

US 2004/0002986 A1 Jan. 1, 2004

(51) Int. Cl.$^7$ ............................................. G06F 17/30
(52) U.S. Cl. ........................... 707/101; 707/1; 707/10; 382/102
(58) Field of Search ................... 707/1, 101; 382/102, 382/160, 187, 188, 189, 224; 703/2; 704/203, 704/231, 251

(56) References Cited

U.S. PATENT DOCUMENTS

| | | | |
|---|---|---|---|
| 5,121,441 A * | 6/1992 | Chefalas et al. | ............ 382/189 |
| 5,303,312 A * | 4/1994 | Comerford et al. | ......... 382/189 |
| 5,315,667 A * | 5/1994 | Fujisaki et al. | ............. 382/187 |
| 5,319,721 A * | 6/1994 | Chefalas et al. | ............ 382/160 |
| 5,455,872 A | 10/1995 | Bradley | |
| 5,544,264 A * | 8/1996 | Bellegarda et al. | ......... 382/188 |
| 5,550,930 A | 8/1996 | Berman et al. | |
| 5,555,317 A | 9/1996 | Anderson | |
| 5,649,027 A | 7/1997 | Mahajan et al. | |
| 5,680,480 A * | 10/1997 | Beernink et al. | ........... 382/187 |
| 5,710,832 A | 1/1998 | Berman et al. | |
| 5,729,629 A | 3/1998 | Dai | |
| 5,802,207 A * | 9/1998 | Huang | ....................... 382/224 |
| 5,812,697 A | 9/1998 | Sakai et al. | |
| 5,933,531 A * | 8/1999 | Lorie | ......................... 382/229 |
| 6,035,062 A * | 3/2000 | Takasu et al. | .............. 382/187 |
| 6,061,472 A | 5/2000 | Hullender et al. | |
| 2003/0088812 A1 | 5/2003 | Hullander | |

OTHER PUBLICATIONS

Vijayshankar Raman; "Locality Preserving Dictionaries: Theory & Application to Clustering in Databases," Symposium on Principles of Database Systems, 1999, pp. 337-345, ACM New York, NY, USA.

Gholamhosein Sheikholeslami; Aidong Zhang, "Approach to Clustering Large Visual Databases Using Wavelet Transform," Proceedings of the SPIE—The International Society for Optical Engineering, 1997, pp. 322-333, vol. 3017, SPIE-Int. Soc. Opt. Eng., USA.

(Continued)

*Primary Examiner*—Jeffrey Gaffin
*Assistant Examiner*—Hassan Máhmoudi
(74) *Attorney, Agent, or Firm*—Banner & Witcoff

(57) ABSTRACT

A technique for reducing a prototype database for use with handwriting recognizers. The prototype database is divided into multiple spaces and the effect on the error rate for removing each prototype is identified. All prototypes that contribute to the error rate are removed. If further prototype database reduction is desired, the technique identifies and removes one or more prototypes that have the least adverse effect on the error rate across all spaces. The technique continues removing prototypes in this manner until a desired prototype database size has been achieved.

16 Claims, 9 Drawing Sheets

OTHER PUBLICATIONS

Stephen Milliner; Mike Papazoglou; Hans Weigand, "Linguistic Tool Based Information Elicitation in Large Heterogeneous Database Networks," Proceedings of the Second International Workshop, 1996, pp. 234-246, IOS Press, Netherlands.

Toshifumi Yamauchi; Yasuharu Itamoto; Jun Tsukumo, "Shape Based Learning for a Multi-Template Method, and Its Application to Handprinted Numeral Recognition," Proceedings of the Fourth International Confeence on Document Analysis and Recognition, 1997, pp. 495-498, vol. 2, IEEE Comput. Soc., Los Alamitos, CA, USA.

Tun-Wen Pai, Keh-Hwa Shyu; Ling-Fan Chen; Gwo-Chin Tai, "Mathematical Morphology Based Shape Feature Analysis for Chinese Character Recognition Systems," Proceedings of the SPIE—The International Society for Optical Engineering, 1995, pp. 922-930, USA.

I. Egorov; V. Lobachev, "Classification of Databases and Database Management Systems in the USSR," 15th International Online Information Meeting Proceedings, 1991, pp. 219-223, Learned Inf., Oxford, UK.

Nell Dale, "Ada Plus Data Structures", 1996, D. C. Heath and Company, p. 169.

* cited by examiner

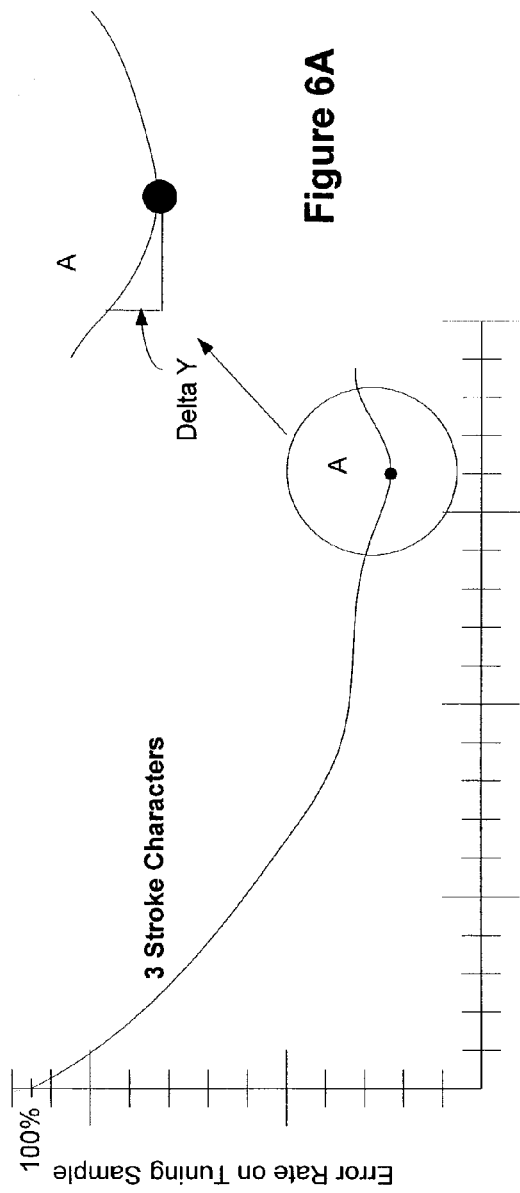
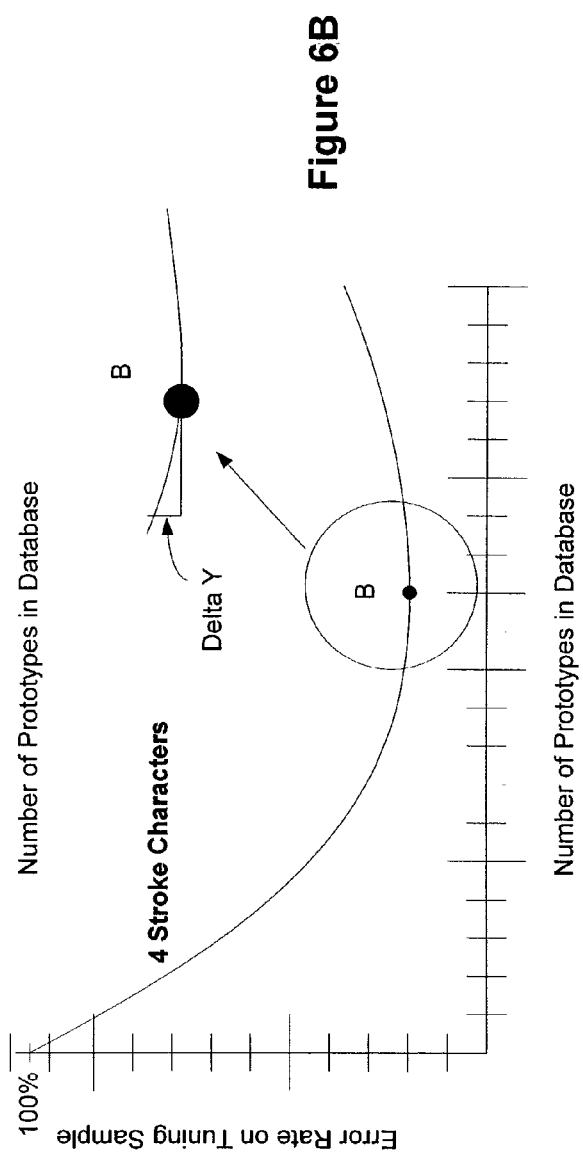

REDUCING AND CONTROLLING SIZES OF PROTOTYPE-BASED RECOGNIZERS

RELATED APPLICATION

This disclosure is related to the following co-pending application: "REDUCING AND CONTROLLING SIZES OF MODEL-BASED RECOGNIZERS" by inventor's Christopher Meek, et al., having U.S. patent application Ser. No. 10/185,172, and filed on Jun. 28, 2002.

FIELD OF THE INVENTION

Aspects of the invention are directed generally to handwriting recognizers. More particularly, aspects of the invention relate to techniques for reducing and controlling the sizes of prototype-based handwriting recognizers.

BACKGROUND OF THE INVENTION

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to write on a screen using, for example, a stylus. For example, the Microsoft READER application permits one to add electronic ink (also referred to herein as "ink") to a document much the same way that a user would write with a standard pen and paper. Hand-held computing devices, commonly known as Personal Digital Assistants (PDAs), as well as the future release of the Tablet PC also permit the user to write on the screen.

A handwriting recognition system may then be used to analyze the electronic ink to recognize characters, for example, Unicode characters. As the user moves the stylus across the screen, the computing device senses the position of the stylus as the user writes and stores the position data. The computing device analyzes the position data and converts it to recognized characters, such as letters or numbers, in a convenient format, such as Unicode format. There are many handwriting recognition systems in use including, for example, prototype-based handwriting recognition systems.

Handwriting recognition systems use algorithms to map handwritten data to characters. For example, handwriting recognition systems may utilize neural networks, Hidden Markov Models, and/or prototypes. In the example, of prototypes, the system internally stores prototypes for each character that can be recognized. A prototype is a "picture" of a handwritten character that is used to map handwriting to a character. Recognition systems use recognition algorithms to measure the distance from handwritten data to one or more prototypes. As long as the user writes like the prototypes, the handwritten data is successfully recognized.

Conversely, the more dissimilar the handwritten data and the prototype are, the more likely it is that the handwritten data will be misrecognized. Misrecognition is typically due to the differences in user handwriting styles and legibility of the handwriting. For example, the handwritten word "dear" may be misrecognized as the word "clear" depending on the way the user writes a "d" and the prototypes for the character "d," "c," and "l."

One way to minimize the risk of misrecognition is to have a good prototype database, which provides the various possible shapes the recognizer should understand for any given character. A good prototype database, however, may require multiple prototypes for each character to be recognized. Generally, the greater the number of prototypes in the prototype database, the more accurate the recognizer. This can be quite problematic, for example, in the case where the recognizer is for an East Asian language. East Asian languages typically have thousands of characters. To compound the problem, East Asian language characters are also inherently complex and typically require multiple strokes of ink to form each character. The prototype database for an East Asian language may therefore have hundreds of prototypes for each character. The original prototype database for an East Asian language may have millions of prototypes and may require tens of millions of bytes of memory.

A large prototype database can be undesirable for many reasons. For example, a large prototype database requires long search times. The required time for the recognizer to recognize East Asian language characters may therefore be unacceptably long. As another example, in the context where the recognizer is part of a smaller computing device, such as a handheld Personal Digital Assistant (PDA), the required memory for the prototype database may be unacceptably large.

One option to overcome the above problems is to limit the size of the prototype database. The difficulty arises, however, in being able to limit the prototype database without significantly compromising the ability of the handwriting recognizer to accurately recognize characters. Training algorithms may be used to select a good subset of the possible prototypes, however, these training algorithms are unable to limit the prototype database without adversely affecting the recognizer's accuracy. Moreover, to maintain desired character recognition accuracy, the training algorithms are unable to sufficiently limit the size of the prototype database.

It is therefore desirable to adequately reduce the size of a prototype database with minimal effects on character recognition accuracy.

BRIEF SUMMARY OF THE INVENTION

The invention provides a method and apparatus for reducing and controlling the size of a handwriting recognition system by iteratively removing prototypes from the prototype database. The particular prototypes to be removed may be determined generally by selecting those prototypes that adversely affect the accuracy of character recognition the least.

In accordance with one embodiment, a process, implemented as computer-executable instructions, for reducing a prototype database is disclosed. The process runs a tuning set through the handwriting recognizer to identify a list of best match prototypes for each tuning sample in the tuning set. The process then determines, for each prototype, how the error rate would be affected if the prototype was to be removed. The prototypes for each space may thereby be ordered according to their effect on the error rate. Once this is achieved, the process may remove all prototypes that would result in actually reducing the error rate. The process may then start removing prototypes to achieve a desired prototype database size. In particular, the process identifies a prototype from all of the spaces that has the least adverse effect on the error rate. The process removes that prototype from the database and performs some updating of the prototype ranking based on error rate. The process continues removing prototypes until the desired prototype database size has been achieved.

These and other features and aspects of the invention will be apparent upon consideration of the following detailed description of various embodiments of the invention.

BRIEF DESCRIPTION OF THE DRAWINGS

The foregoing summary of the invention, as well as the following detailed description of embodiments, is better understood when read in conjunction with the accompanying drawings, which are included by way of example, and not by way of limitation with regard to the claimed invention.

FIGS. 6A and 6B are graphs illustrating the relationship between number of prototypes in a given space and the error rate.

DETAILED DESCRIPTION OF THE INVENTION

Figure 1:
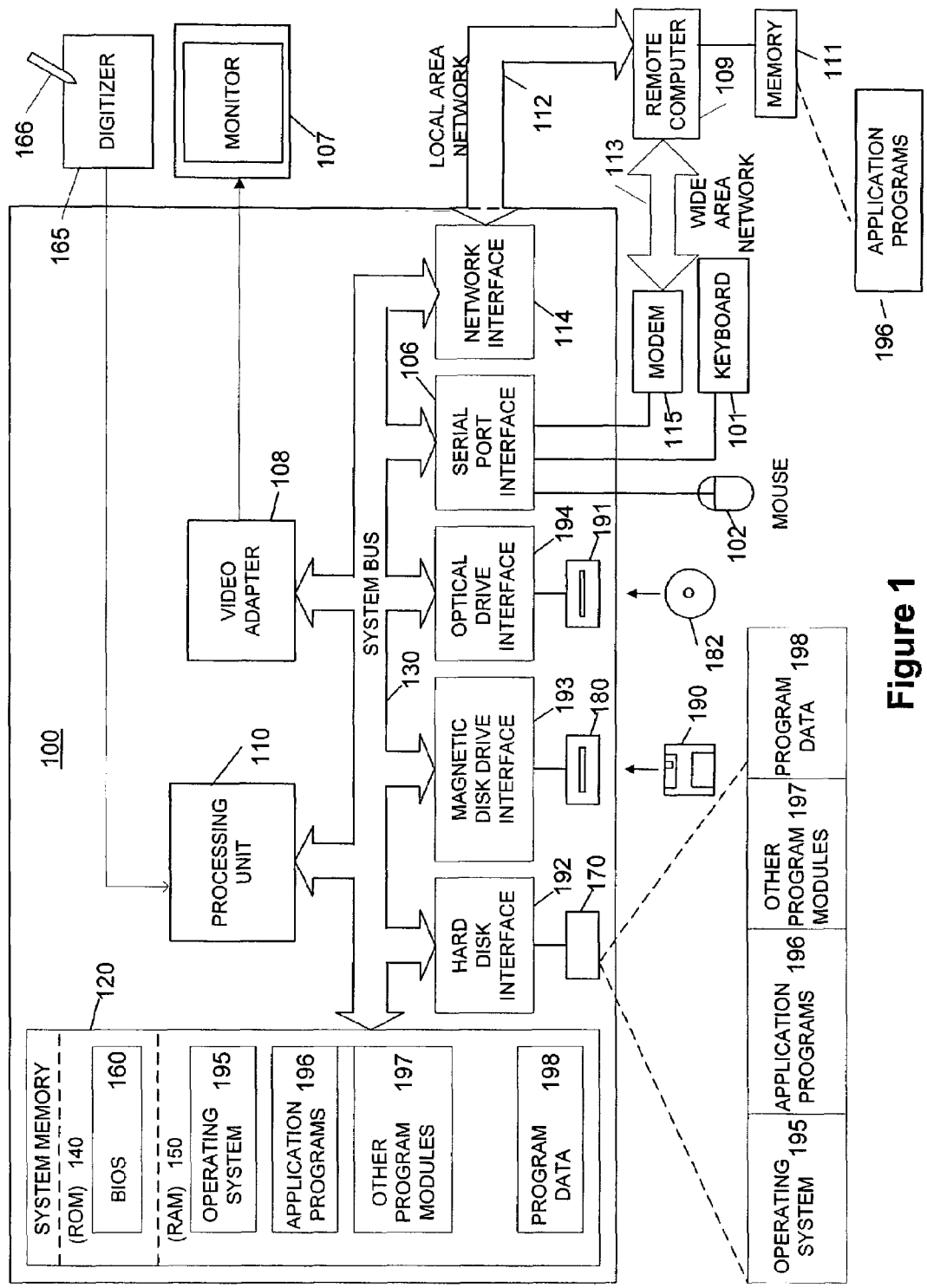
FIG. 1 shows a schematic diagram of a general-purpose digital computing environment that can be used to implement various aspects of the invention.

The exemplary disclosed system and method provide a technique for reducing and controlling the size of a prototype database, for use with a handwriting recognizer, with minimized effect on error rate. In particular, a database reduction process determines the effect that removing each prototype from the database would have on the error rate. The process then reduces the database to remove any prototypes that actually cause an increase the error rate. The process then iteratively removes prototypes from the database that have the least effect on error rate until the desired database size is reached.

Although not required, the invention will be described in the general context of computer-executable instructions, such as program modules. Generally, program modules include variables, routines, classes, objects, scripts, components, data structures, and the like that perform particular tasks or implement particular abstract data types. The invention provides for a software system that may be implemented on any network infrastructure such that networked devices may be remotely controlled by, for example, a general-purpose computer, or a system whereby the networked devices may share information with and about each other. The invention provides and accepts common command, control, and communication through the network while retaining the ability of each device to operate autonomously. In a distributed computing environment, program modules may reside on both local and remote devices.

Terms

Ink or electronic ink as used herein refers to a sequence or a set of strokes with properties. The sequence of strokes may include strokes ordered, for example, by the time captured. Each stroke is comprised of a sequence of points, which may be represented using a variety of known techniques including Cartesian coordinates (X, Y), polar coordinates (r, Θ), and other techniques as known in the art.

A stroke as used herein refers to a sequence or set of captured points. For example, when rendered, the sequence of points may be connected with lines. Alternatively, the stroke may be represented as a point and a sequence of vectors in the directions of the next point. In short, a stroke is intended to encompass any representation of points or segments relating to ink, irrespective of the underlying representation of points and/or what connects the points. In one example, as illustrated herein, a stroke may consist of the sequence or set of points captured from when a user makes a pen down action to when the user makes a pen up action.

A character is a known letter or symbol for a specific language such as, for example, the letter "a" or the symbol "$." Characters can also be code points, for example, as ASCII elements or UNICODE elements or can be letters or symbols for a particular language. Characters may also generally be shapes, for example, squares, triangles or circles. Characters can be categorized according to the number of strokes it typically takes to write the character.

A prototype as used herein refers generally to a "picture" of a handwritten symbol that is used to map handwriting to a character. Each prototype can be described as a sequence of numbers representing various features of each stroke in the prototype including, for example, the start point, the end point, the curvature, the overall shape, etc. A prototype for a given character therefore quantifies various features of the prototype.

A tuning sample is a character input representing a character that a user would write. Each tuning sample would depict the various ways that a user could write characters.

A tuning set is a set of tuning samples that contain a representative sample of what typical users would write. For example, the tuning set may be those character inputs that a type of users would typically write (e.g., left-handed users). The tuning set may, for example, be a training set and can consist of as many as 20 million tuning samples.

General Purpose Computing Environment

FIG. 1 illustrates a schematic diagram of an exemplary conventional general-purpose digital computing environment that can be used to implement various aspects of the invention. The invention may also be implemented in other versions of computer 100, for example without limitation, a hand-held computing device, a Tablet PC, or may be an application for use with a more general computing device such as a personal computer. The invention may also be implemented in part of a multiprocessor system, a microprocessor-based or programmable consumer electronic device, a network PC, a minicomputer, a mainframe computer, hand-held devices, and the like. Hand-held devices available today include Pocket-PC devices manufactured by Compaq, Hewlett-Packard, Casio, and others.

Referring still to FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), which is stored in the ROM 140, contains the basic routines that help to transfer information between elements within the computer 100, such as during start-up. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 182 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and/or a pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for communicating over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web server. Any of various conventional web browsers can be used to display and manipulate data on web pages.

Figure 2:
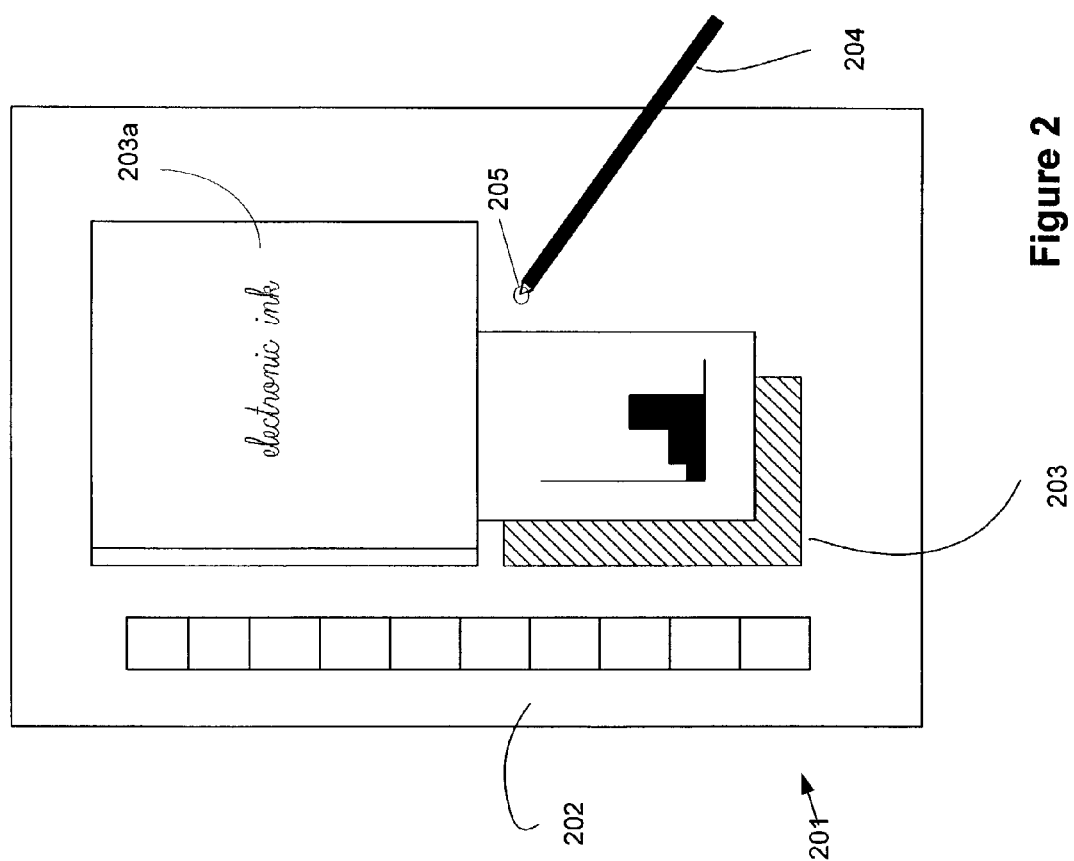
FIG. 2 is a schematic block diagram of an exemplary hand-held device or tablet PC that can be used in accordance with various aspects of the invention.

FIG. 2 illustrates an exemplary hand-held device or Tablet PC 201 that can be used in accordance with various aspects of the invention. Any or all of the features, subsystems, and functions in the system of FIG. 1 can be included in the computer of FIG. 2. Hand-held device or Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Hand-held device or Tablet PC 201 interprets gestures made using stylus 204 in order to manipulate data, enter text, create drawings, and/or execute conventional computer application tasks such as spreadsheets, word processing programs, and the like. For example, a window 203a allows a user to create electronic ink using stylus 204. An example of electronic ink is shown in window 203a.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used.

Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One such service enables an application to read and write ink using the disclosed representations of ink. The ink platform may also include a mark-up language including a language like the extensible markup language (XML). Further, the system may use DCOM as another implementation.

Overview of Character Recognition Process

Figure 3:
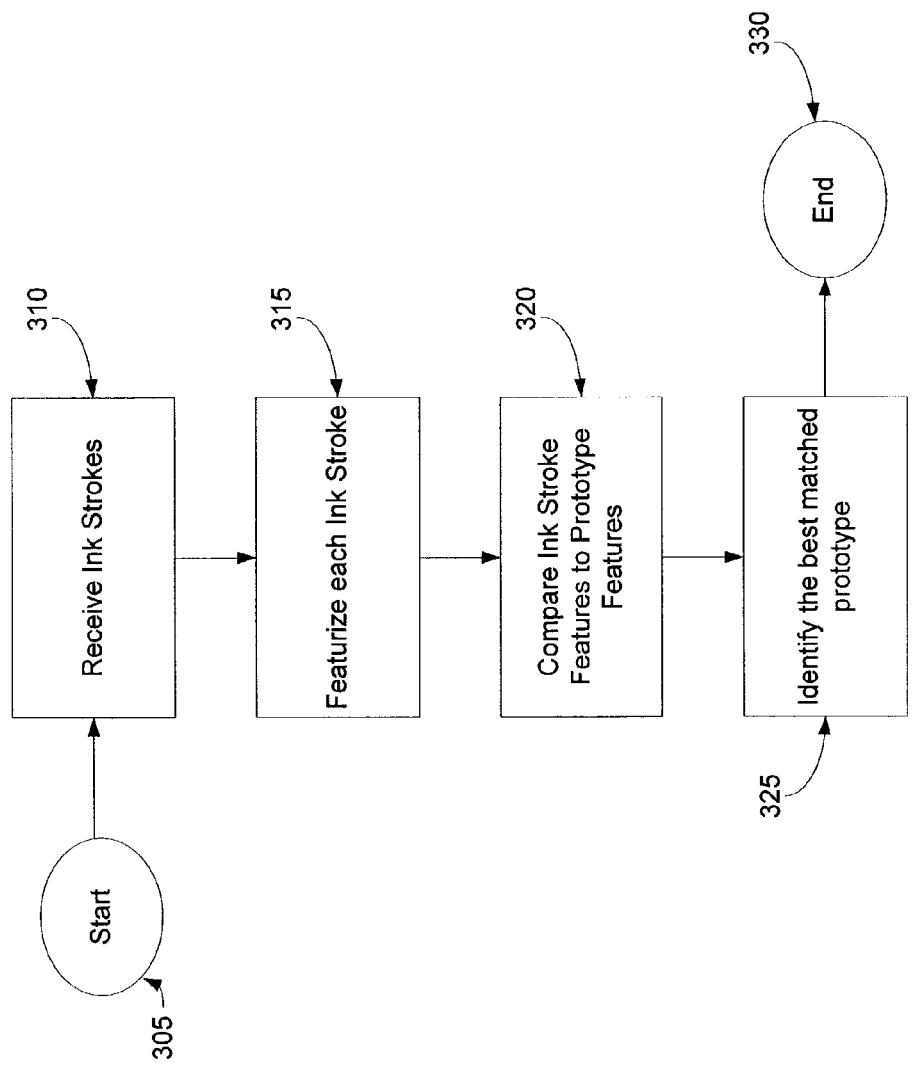
FIG. 3 is a flow chart illustrating the overall character recognition process.

As discussed, a handwriting recognizer analyzes the ink strokes and converts them into recognized characters, such as letters or numbers, in a convenient format, such as Unicode format. FIG. 3 illustrates the overall character recognition process. The process starts at step 305 once a user inputs a character comprising one or more ink strokes. At step 310, the computing device senses and stores the position of these ink strokes. At step 315, the computing device processes each ink stroke to extract the features of each ink stroke. Each stroke can therefore be described as a sequence of numbers representing various characteristics or features of the stroke including, for example, the start point, the end point, the curvature, the overall shape, etc. At step 320, the computing device compares the features of the inputted character with the features of each of the prototypes in the prototype database. At step 325, the computing device identifies the prototype(s) that are the best match(es) based on the closeness of the differences of the various features between the inputted character and the prototype. The system associates the inputted character with the character corresponding to the best match prototype.

Because the computing device compares the features of the inputted character with those of prototypes in a linear fashion, character recognition may cause long delays especially if the prototype database is large. The present invention overcomes this delay by providing a reduced prototype database that has the least adverse effect on error rate.

Figure 4:
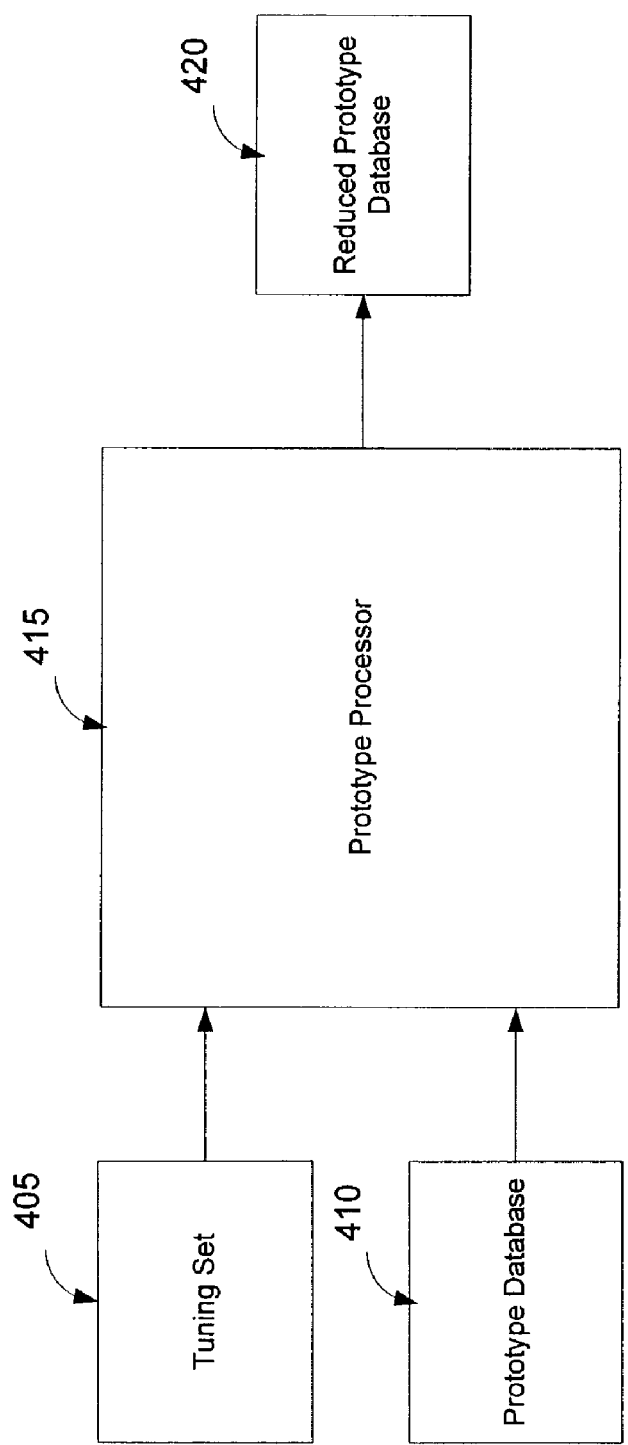
FIG. 4 is a schematic block diagram generally depicting the system for providing a reduced prototype database in accordance with a preferred embodiment of the present invention.

FIG. 4 is a schematic block diagram of the overall components for providing a reduced prototype database in accordance with a preferred embodiment of the present invention. The system comprises a tuning set 405 and a prototype database 410 that is to be reduced in size. As discussed, the tuning set 405 is a set of character inputs that contain a representative sample of what a typical user would write. The tuning set 405 provides a representative distribution of characters that users are expected to write. For example, in the English text, the letter "e" is much more common, and therefore much more important that it be recognized accurately, than the letter "q". For the database reduction process to account for this, the distribution of samples in the tuning set 405 in a preferred embodiment matches this distribution. In another embodiment, differing weights to samples of particular characters may be provided in the tuning set 405. A prototype processor 415 is generally a program module or a set of computer-executable instructions. The prototype processor 415 receives the prototype database 410 and, using the tuning set 405, generates a reduced prototype database 420 using the processing techniques described herein.

Figure 5:
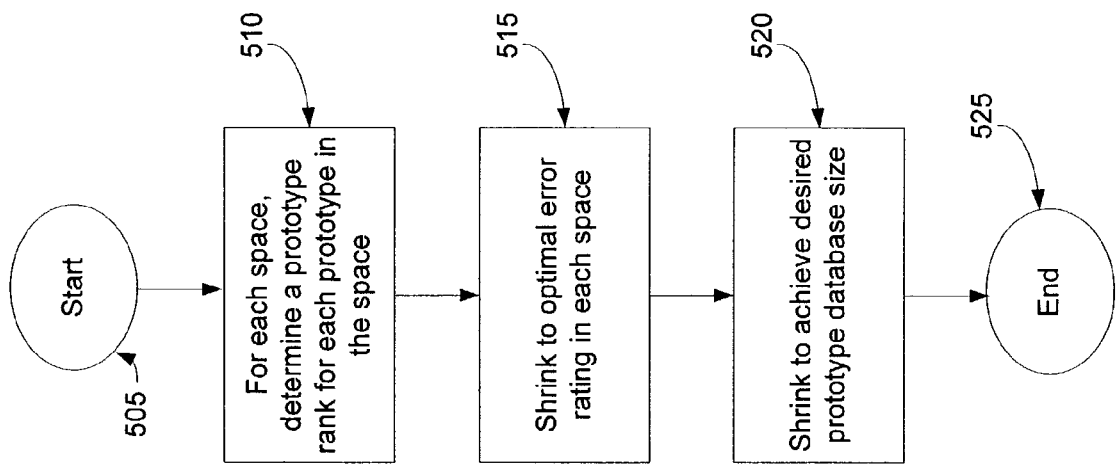
FIG. 5 is a flow chart depicting the overall process for reducing the prototype database in accordance with a preferred embodiment of the present invention.

FIG. 5 illustrates the overall process for reducing the prototype database in accordance with the present invention. The process starts at step 505 and at step 510, the process examines each prototype space and determines a prototype rank for each prototype in each space. As discussed, a character may consist of one or more strokes. The prototype database may be subdivided into multiple spaces based on the number of strokes the associated character contains. Accordingly, the prototype database may be subdivided into prototypes for characters having 1 or 2 strokes, prototypes for characters having three strokes, prototypes for characters having 4 strokes, etc. In an East Asian language, for example, the prototype database may be divided into as many as twenty-seven spaces. Greater or fewer spaces may of course be utilized in accordance with the present invention.

For each prototype space, each prototype is processed to determine its rank amongst the other prototypes in that space. Described in greater detail herein, this rank determines the order in which prototypes would be removed from the space. Once ranked, the error rate for each space may also be determined as a function of the number of prototypes that are in that space. This may be represented graphically, for example, in FIGS. 6A and 6B. FIG. 6A is an illustrative graph charting the error rate of a tuning sample for a prototype space representing three-stroke characters. The error rate is 100% when the number of prototypes for three-stroke characters is zero. The error rate reduces as the number of prototypes increases. At point A, the rate reaches an optimal point whereby adding any more prototypes to the three-stroke character sub-database would cause an increase in the error rate. FIG. 6B is another graph illustrating the error rate of the tuning sample for a prototype space representing four-stroke characters. As illustrated in this figure, point B identifies the optimal prototype number for which error rate is at a minimum. These charts may be generated from an effect on error rate table 810 (FIG. 8B), which is discussed in greater detail herein.

Referring back to FIG. 5, at step 515, the process removes prototypes from each space until the optimal or lowest error rate is achieved in each space. In the example of FIGS. 6A and 6B, the process would remove prototypes from the three- and four-character spaces until points A and B, respectively, were reached. In the case where the prototype space has local minima, the process is capable of achieving a prototype size that achieves absolute minima. Alternatively or additionally, the process may seek to be below a threshold error rate.

It still may be desirable, however, to reduce the prototype database even further. Accordingly, at step 520, the process starts removing one at a time prototypes from the spaces in a manner that reduces accuracy the least (or that increases the error rate the least). The prototypes are removed one at a time until the desired prototype database size is achieved. Each time the process seeks to remove a prototype, it selects a prototype across all the spaces that reduces accuracy the least. Thus, for each space, the process determines the incremental increase in the error rate if the next prototype was removed. For each prototype candidate in the space, the process identifies the prototype that causes the least increase in error rate. The identified prototype is thereby removed from the prototype database. The process continues removing prototypes and, at step 525, the process stops once the desired prototype size is achieved. This process can be illustrated graphically with reference to the example of FIGS. 6A and 6B. From the optimal points A and B, the process determines the effect on error rate for removing the next prototype in each space. Graphically, the process compares the delta Y's for each of the spaces. In the example of the 3-stroke and 4-stroke character spaces, since deletion of a prototype from the 4-stroke character space has lesser effect on error rate (i.e., smaller delta Y), that prototype will be deleted. Once again, it will be appreciated that the process may delete more than one prototype at this step such that fewer iterations would need to be performed to achieve the desired prototype database size. Alternatively, the process may also take into account the size of the prototypes in determining which prototype(s) to delete. Thus, larger prototypes may be given higher preference for removal to more efficiently achieve the desired prototype size.

Figure 7:
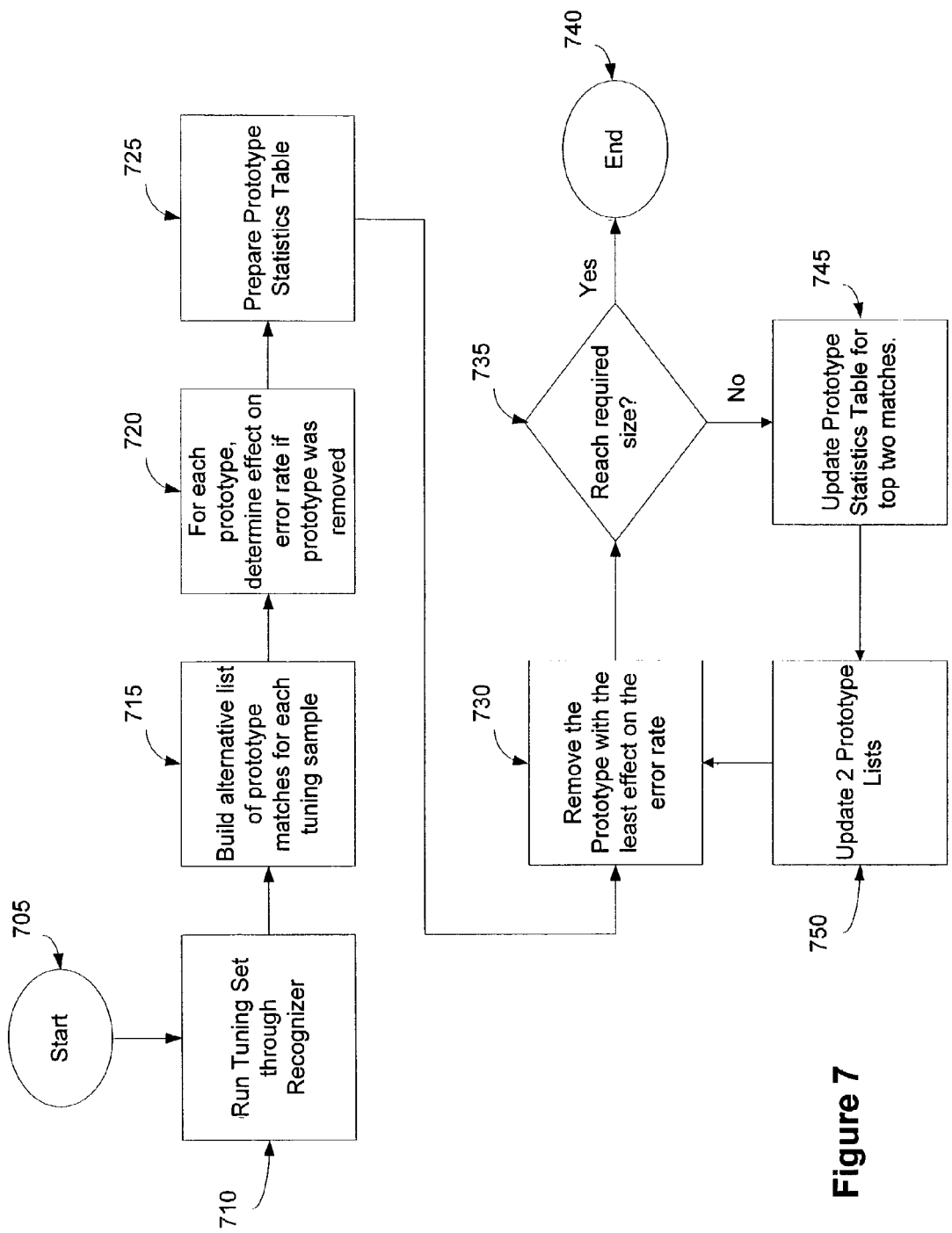
FIG. 7 is a flow chart depicting in more detail the process for reducing the prototype database in accordance with a preferred embodiment of the present invention.

FIG. 7 is a flow chart depicting in more detail the process for removing prototypes from a space with minimized effect on the error rate. Since this process is performed for each space in the prototype database, the tuning set is partitioned so that characters in the tuning set run through appropriate spaces. For example, four-stroke characters from the tuning set would be compared against only the four-stroke character space in the prototype database. As will become more apparent in the following discussion, the process of FIG. 7 determines an order of the prototypes in each space such that the illustrative charts of FIGS. 6A and 6B may be generated.

Figures 8A, 8B:
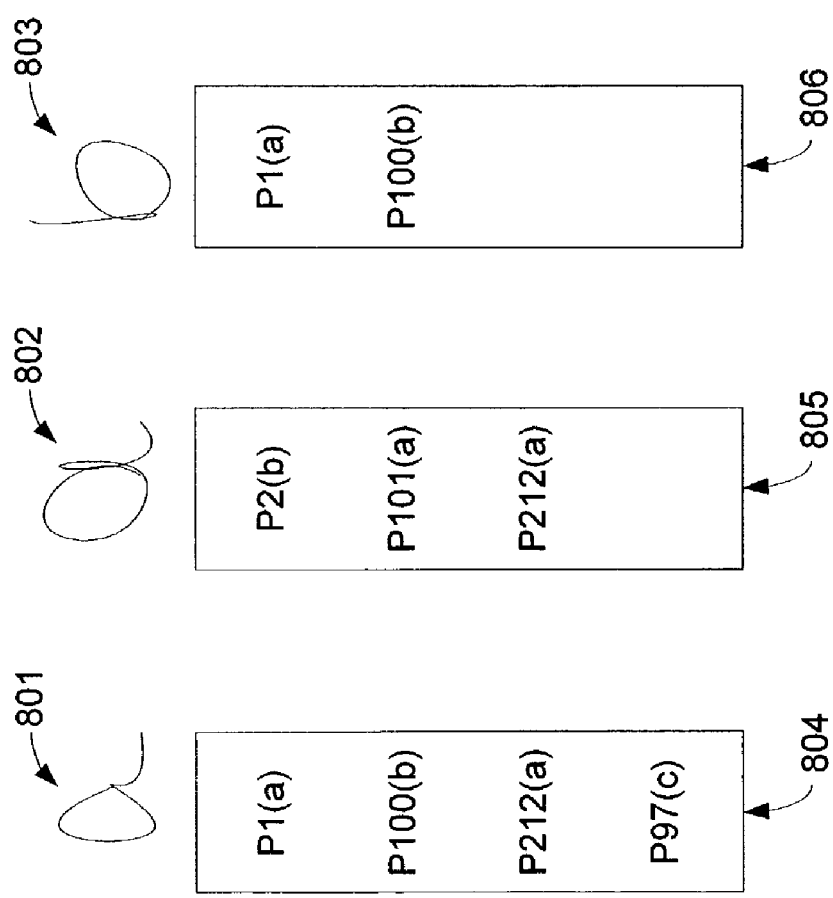
FIG. 8A illustrates an example of how the process of the present invention matches prototypes to tuning samples.
FIG. 8B depicts a table that ranks the prototypes of FIG. 8A according to their effect on the error rate.

The process starts at step 705 and at step 710, the process runs the portion of the tuning set corresponding to a specific space through the recognizer. For each tuning sample within the tuning set, the process, at step 715, identifies a sorted list of prototypes that best matches the tuning sample in order of closeness. For example, a nearest-neighbor classifier may be utilized to measure the closeness of prototype and a tuning sample. FIG. 8A illustrates an example of how the process matches prototypes to tuning samples. Shown in the figure are tuning samples 801, 802, and 803 representing one-stroke characters "a", "a", and "b", respectively. The process generates a list of best match prototypes for each tuning sample. Accordingly, for tuning sample 801, a prototype list 804 is generated showing four possible prototypes that best matches tuning sample 801. Prototype P1(a) in the list represents the prototype that is the best match to tuning sample 801. The following prototypes in the list, starting with prototype P100(b), are prototype matches in decreasing order.

Each prototype in FIG. 8A is identified according to a unique number and the character that it represents. Accordingly, prototype P100(b) signifies that it is the 100$^{th}$ prototype in the space and also that it is a prototype for the character "b". Thus, tuning sample 801 has a best match prototype P1(a) that correctly recognizes the tuning sample's character. Tuning samples 802 and 803, however, are misrecognized. It will be appreciated that FIG. 8A is a highly simplified depiction of the process for illustration purposes only. As discussed, the number of tuning samples for any given space may be in the range of millions and the number prototypes may be in the range of tens of thousands.

Referring back to FIG. 7, at step 720, the process determines the error rate on the tuning samples if one of the prototypes was removed from the prototype space. In the illustration of FIG. 8A, without prototype P1(a), tuning samples 801 and 802 would be misrecognized, while tuning sample 803 would be correctly recognized. Accordingly, without prototype P1(a), there would be no effect on the error rate. As another example, without prototype P2(b), tuning samples 801 and 802 would be correctly recognized while tuning sample 803 would remain misrecognized, resulting in a decrease in the error rate by 1. This process is performed for each prototype in the prototype database.

Figure 9:
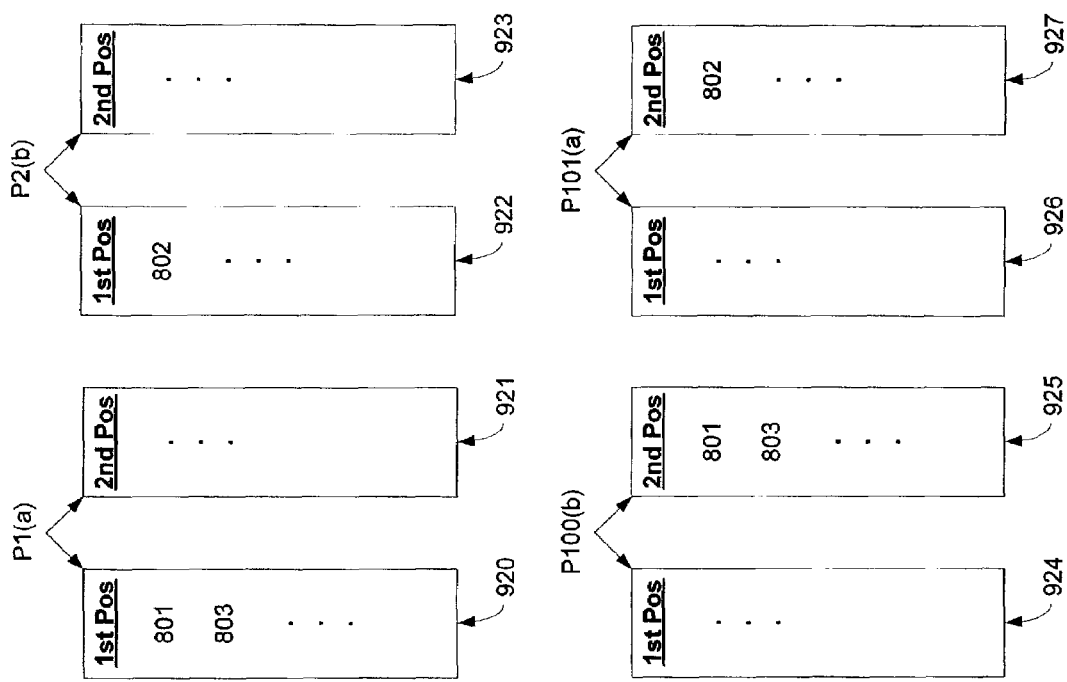
FIG. 9 depicts prototype tables identifying where the prototypes of FIG. 8A were ranked first or second in the match list.

Referring back to FIG. 7, at step 725, the process builds prototype statistics tables for each space and, in particular, it builds an effect-on-error-rate table and prototype position tables. As shown in FIG. 8B, table 810 is an effect-on-error-rate table, which is a heap data structure table that quantifies by how much the error rate would be affected by removal of each prototype. The process orders the prototypes in increasing order of affect on the error rate. Thus, when removing prototypes, the process may start deleting prototypes starting with those that have the least effect on the error rate. As shown in FIG. 9, tables 920–927 are prototype tables. For each prototype in a particular space, the process generates two prototype tables. The first prototype table identifies those tuning samples where the prototype was ranked first in the list of best match prototypes (FIG. 8A). The second prototype table identifies those tuning samples where the prototype was ranked second in the list of best match prototypes (FIG. 8A). Thus, in the example of FIG. 8A, prototype table 920 identifies prototypes 801 and 803 where prototype P1(a) was ranked first in lists 804 and 806. Those skilled in the art will appreciate that greater or fewer prototype tables could be generated in accordance with the present invention.

Referring back to FIG. 7, at step 730, the process deletes prototypes with the least effect on error rate. Initially, the process will delete those prototypes from each space that actually contribute to the error rate (represented as step 515 in FIG. 5). In other words, the process deletes prototypes until the absolute minimum error rate is achieved in each space. Once the optimal error rate is achieved, the process starts removing prototypes to achieve a desired database size (represented as step 520 in FIG. 5). In particular, the process identifies the prototype in each space that has the least adverse effect on the error rate. The process then deletes the identified prototype that has the least effect on the error rate from across all spaces. In one embodiment, the process selects the prototype that has the least effect on error rate without consideration of the prototype's size. Alternatively, the process may determine for each space a proportion of how much memory could be saved versus the increase in error rate for removing the next prototype in that space. This can be done, for example, by taking the ratio of change in error rate to the change in size (error/size). The process performs this task for each space. The process then removes the prototype that that would produce the smallest change in error rate relative to the change in size, namely the prototype that would have the smallest error/size ratio. In yet another embodiment, the process may identify more than one prototype to remove.

Referring back to FIG. 7, at step 735, the process determines whether a desired prototype database size has been reached. If so, at step 740, the process stops. If not, the process continues with removal of more prototypes.

Upon each deletion of a prototype, at step 745, the process recomputes those prototype statistics tables that were identified in the prototype tables for the deleted prototype. For example, if prototype P1(a) was removed, tables 920 and 921 identify tuning samples 801 and 803 that need to be processed again to determine their new best match lists 804 and 806, respectively, and the updated effect-on-error-rate table 810. Based on the updated best match lists 804 and 806, at step 750, the process updates the prototype tables 920–927. In a preferred embodiment, only certain prototype tables would require change, namely those where prototypes which appeared in the top three positions of the best match list of a tuning sample which had P1($a$) in the one of the top two positions in its list. The process then returns to step 730 to delete the next prototype with the least effect on error rate. The process continues until the desired prototype database size has been achieved. The sequence of prototype deletions may be graphically represented, for example, as illustrated in FIGS. 6A and 6B.

The present invention therefore provides a mechanism to reduce the size of a prototype database with minimized effects on accuracy. Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the invention. Also, where certain units of properties such as size (e.g., in bytes or bits) are used, any other units are also envisioned.

We claim:

1. A method of reducing a prototype database for use with a handwriting recognizer comprising the steps of:
   (a) providing the prototype database with at least two spaces that subdivide the prototype database according to strokes per character such that prototypes in different spaces of the at least two spaces have different numbers of strokes per character;
   (b) selecting at least two prototypes from the prototype database, wherein the selected prototypes are from at least two spaces;
   (c) determining how removal of each selected prototype would affect an error rate when a tuning set is processed by the handwriting recognizer by determining how many tuning samples, which would otherwise be correctly recognized, will be misrecognized as a result of removing each selected prototype and by determining how many tuning samples, which would otherwise be misrecognized, will be correctly recognized as a result of removing each selected prototype; and
   (d) removing from the prototype database at least one of the selected prototypes that has the least adverse effect on error rate.

2. The method of reducing a prototype database of claim 1, further comprising the step of:
   (e) repeating step (c) to obtain an updated ranking of each selected prototype; and
   (f) repeating step (d) to remove at least another one of the selected prototypes that has the least adverse effect on the error rate.

3. The method of reducing a prototype database of claim 1, further comprising the step of:
   (e) repeating steps (c) and (d) until a desired prototype database is achieved.

4. The method of reducing a prototype database of claim 1 wherein the step of selecting further comprises the step of selecting each prototype from the prototype data base.

5. The method of reducing a prototype database of claim 1 wherein the step of removing further comprises the step of removing from the prototype database a least one of the selected prototypes that minimizes a ratio of an adverse effect on error rate to a memory-size saving a tributable to removal of a prototype from the database.

6. The method of reducing a prototype database of claim 1, further comprising the step of:
   (e) ranking each selected prototype according to its effect on the error rate.

7. The method of reducing a prototype database of claim 1, further comprising the step of:
   (e) forming for each space an effect-on-error rate table for the selected prototypes.

8. The method of reducing a prototype database of claim 1, further comprising the step of:
   (e) forming for each prototype at least one prototype list.

9. A computer-readable medium having computer-executable instructions or performing the steps recited in claim 1.

10. A prototype database that was generated by the process recited in claim 1.

11. A method of reducing a prototype database for use with a handwriting recognizer comprising the steps of:
   (a) providing the prototype database with at least two spaces that subdivide the prototype database according to strokes per character such that prototypes in different spaces of the at least two spaces have different numbers of strokes per character;
   (b) selecting prototypes from the prototype database, wherein the selected prototypes belong to varying spaces;
   (c) determining how removal of each selected prototype would affect an error rate for the associated space when a tuning set is processed by the handwriting recognizer by determining how many tuning samples, which would otherwise be correctly recognized, will be misrecognized as a result of removing each selected prototype and by determining how many tuning samples, which would otherwise be misrecognized, will be correctly recognized as a result of removing each selected prototype;
   (d) ranking each selected prototype in its respective space according to its effect or the error rate; and
   (e) removing from the prototype database at least one of the selected prototypes that has the least adverse effect on the error rate.

12. The method of reducing a prototype database of claim 11, further comprising the steps of:
   (f) repeating step (d) to obtain an updated ranking of each selected prototype; and
   (g) repeating step (e) to remove at least another one of the selected prototypes that has the least adverse effect on the error rate.

13. The method of reducing a prototype database of claim 12, further comprising the step of:
   (h) repeating steps (f) and (g) until a desired prototype database size has been achieved.

14. A system for reducing the size of a prototype database comprising in combination:
   (a) a tuning set;
   (b) a prototype database; and
   (c) a prototype processor having computer-executable instructions for performing the steps of: (i) receiving the prototype database having at least two spaces that subdivide the prototype database according to strokes per character such that prototypes in different spaces of the at least two spaces have different numbers of strokes per character; (ii) selecting at least two prototypes from the prototype database, wherein the selected prototypes are from at least two spaces; (iii) determining how removal of each selected prototype would affect an error rate when the tuning set is processed by the handwriting recognizer by determining how many tuning samples, which would otherwise be correctly recognized, will be misrecognized as a result of removing each selected prototype and by determining how many tuning samples, which would otherwise be misrecognized, will be correctly recognized as a result of removing each selected prototype; and (iv) removing from the prototype database at least one of the selected prototypes that has the least adverse effect on error rate.

15. The system for reducing the size of a prototype database of claim 14, further comprising:

(d) a prototype statistics table having a ranking of an effect each selected prototype has on the error rate.

16. The system for reducing the size of a prototype database of claim 15, further comprising:

(e) at least one prototype list for each selected prototype identifying tuning samples where the selected prototype had a predetermined rank in an alternative list of prototype matches.

* * * * *

UNITED STATES PATENT AND TRADEMARK OFFICE
CERTIFICATE OF CORRECTION

PATENT NO. : 6,970,877 B2
APPLICATION NO. : 10/184367
DATED : November 29, 2005
INVENTOR(S) : Rowley et al.

It is certified that error appears in the above-identified patent and that said Letters Patent is hereby corrected as shown below:

On page 2, item (56), under "Other Publications", in column 1, line 9, delete "Confeence" and insert -- Conference --, therefor.

On page 2, item (56), under "Other Publications", in column 2, line 1, after "Pai" delete "," and insert -- ; --, therefor.

On page 2, item (56), under "Other Publications", in column 2, line 10, after "Nell" insert -- , --.

On page 2, item (56), under "Other Publications", in column 2, line 10, delete "Heath" and insert -- Heth --, therefor.

In column 12, line 6, in Claim 5, delete "a least" and insert -- at least --, therefor.

Signed and Sealed this

First Day of September, 2009

David J. Kappos
*Director of the United States Patent and Trademark Office*